Inventor:
Robert B. Tatge,
by His Attorney.

United States Patent Office 3,504,531
Patented Apr. 7, 1970

3,504,531
MECHANICAL IMPEDANCE TESTING USING
RANDOM NOISE EXCITATION
Robert B. Tatge, Scotia, N.Y., assignor to General
Electric Company, a corporation of New York
Filed June 2, 1967, Ser. No. 643,142
Int. Cl. G01m 7/00
U.S. Cl. 73—67.1                                      1 Claim

ABSTRACT OF THE DISCLOSURE

A method and means for measuring mechanical impedance as a function of frequency in a way to eliminate the necessity for long time structural excitation of a subject structure applies a random noise excitation to a structure for a few seconds. The amount of excitation and corresponding response are detected by two transducers which transmit the response from the transducers to a two channel tape recorder where these responses are simultaneously recorded upon separate channels of the recorder. These two test signals are later reproduced and passed through individual channels of a two channel narrow band pass filter, both channels of which are tuned to the same frequency which is of interest, to provide signals representing excitation and response in the substantially single frequency filter band pass. They are then analyzed for magnitude and phase angle of the impedance to determine the response characteristics of the structure.

---

This invention relates to a system for measuring mechanical impedance of a structure, and in particular to methods and apparatus for measuring mechanical impedance of a structure by subjecting the structure to test conditions for a short time.

In current apparatus used for determining vibration characteristics of a structure a sinusoidal force signal is generated by a force generator, such as an electromagnetic or electrohydraulic shaker, and applied to the structure through a force transducer. The resulting motion of the structure is sensed by a vibration transducer, usually an accelerometer. If the force and resultant motion are to be measured coincidentally, the force and motion transducers may be combined in what is generally known as an impedance head. The response of the structure as a function of frequency is found by changing the frequency of the applied force signal in discrete increments or by slowly sweeping through a frequency band. Using either of the above procedures, a long time excitation of the structure is required because the sweep rate must be so slow as to permit both the structure and the filters to reach essentially steady-state response conditions at each test frequency.

It is an object of this invention to provide the measurement of the components of mechanical impedance as a function of frequency by short term excitation..

It is another object of this invention to provide a means for analysis of short term excitation mechanical impedance as a function of frequency.

It is another object of my invention to provide means for determination of a unique frequency responsive signature for any structure.

In brief, my invention comprises a wide-band random noise force generator which supplies energy to a force transducer mounted upon a structure. Such excitation simultaneously applies forces to the structure at all frequencies of interest, thereby reducing the excitation time over that which would be required if these forcing frequencies were applied sequentially as in current practice.

At the same or another point on the structure is a velocity transducer for receiving velocity signals. Both the force transducer and velocity transducer supply electrical signals to a two track tape recorder. The tape of the two track tape recorder is then made into an endless loop which is played repeatedly and its outputs and that of an oscillator are supplied to a conventional two channel tracking filter of a conventional commercially available type. If the filter band width is narrow compared to the bandwidth of the structure at its resonant and antiresonant frequencies, the outputs of the tracking filter are equivalent to the force and velocity signals which would be realized at the frequency of the oscillator when conventional sine wave excitation is used. These signals may be analyzed by conventional techniques to determine the magnitude and phase angle of the impedance.

Other objects and advantages of this invention will become apparent during consideration of the detailed description and drawings.

Figure 1:
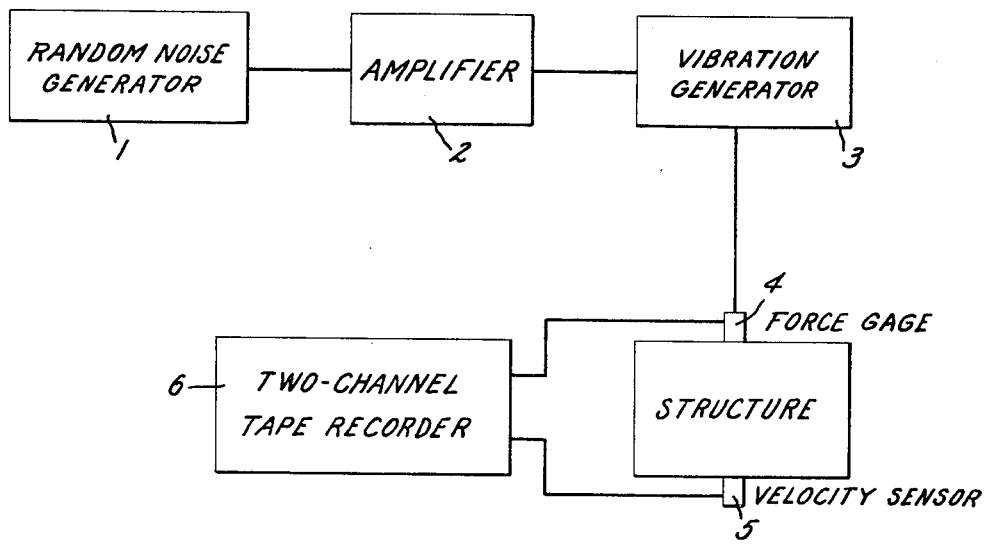
FIGURE 1 shows a signature generator system of my invention.

In FIGURE 1 is shown a signature generator for use in connection with my invention. In the development of a unique signature characteristic of a structure, either the complex ratio $F/V$ which is called mechanical impedance or $V/F$ which is called mobility may be used, where F is applied force and V is the resultant velocity. Such complex ratios as a function of frequency are unique to any given structure under test. Subsequent tests on the same structure may be used to detect changes in the structure. Tests on two or more structures may be used to compare these structures. In the device of FIGURE 1 a random noise generator 1 is shown first, the output of which in its turn is amplified by amplifier 2 and supplied to a conventional vibration generator 3. The output of the conventional vibration generator drives a structure through a force transducer 4.

In this device the random noise signal is supplied to the force transducer 4 which vibrates the structure. A velocity transducer 5 is located at an appropriate spot on the structure to sense vibration. The electric signals from the force transducer 4 and the velocity transducer 5 are supplied simultaneously for a limited time to a two channel recorder 6, for example, a two channel tape recorder.

Figure 2:
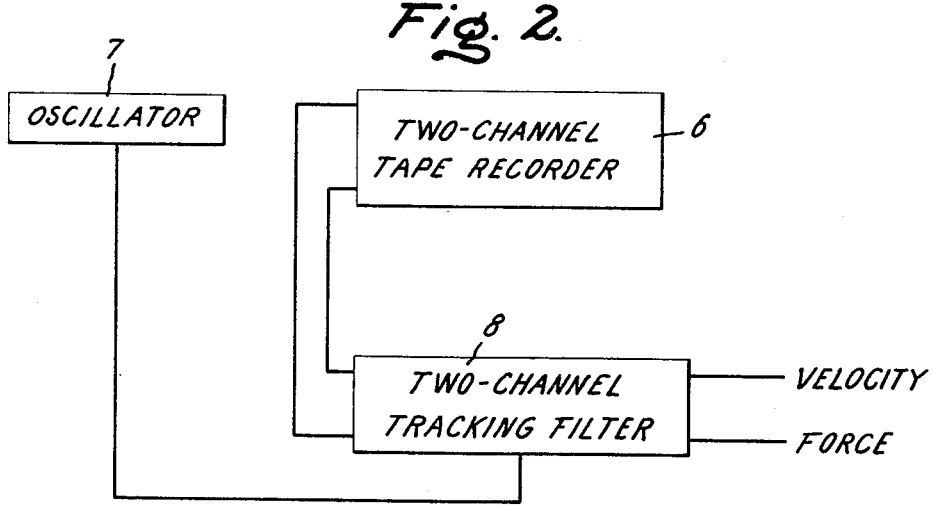
FIGURE 2 shows the data reduction equipment introduced with the signature generator.

In the data reduction equipment of FIGURE 2 a variable frequency oscillator 7 is connected to a two channel tracking filter 8, which is so constructed that it automatically tunes itself to the frequency imposed by the oscillator. The output of the oscillator is varied over the frequency range in which the characteristics of the structure are to be determined. The tape which carries the previously recorded information is formed into an endless loop and played over and over on recorder 6, the two tape recorded signals being supplied to the two tracking filter input terminals. The mechanical impedance characteristic of a structure as a function of frequency includes multiple resonant points at which the impedance reaches minima, and multiple antiresonant points at which the impedance reaches maxima. A narrow bandwidth filter is used to analyze the force and velocity signals in order that, at these and other frequencies, signal components remote from the frequencies of interest are rejected. If the filter bandwidth is narrow compared to the bandwidth of the structure at its resonant and antiresonant frequencies, the outputs of the tracking filters are equivalent to the force and velocity signals which would be realized by exciting the structure at the same frequency using sine wave excitation. These signals are analyzed by conventional techniques to determine the magnitude and phase angle of the impedance. Such techniques are described in Patents 3,070,996; 3,162,039 and 3,296,528 to Fred Schloss and assigned to the United States of America.

By means of the structures and the method used, in a relatively few seconds a signal is generated which will have the force and effect of the conventional long term excitation of structures to give a characteristic signature.

It is another advantage of this technique that the apparatus used is conventional and simple to assemble and remove.

It is understood that acceleration, velocity and displacement are derivable from each other, if one knows one of these and the frequency. Throughout this specification the term velocity is understood to include the others.

The foregoing is a description of an illustrative embodiment of the invention, and it is applicant's intention in the appended claim to cover all forms which fall within the scope of the invention.

What I claim as new and desire to secure by Letters Patent of the United States is:

1. A system for establishing a characteristic mechanical signature of a structure comprising
   means for driving said structure according to random noise vibrations for a short period of time,
   means for sensing the force used in driving said structure and deriving an electrical signal representative thereof,
   means for sensing the velocity of vibration induced in said structure and deriving another electrical signal representative thereof,
   means for simultaneously recording said signals,
   a two channel tracking filter having a narrow pass band which is tuneable over a broad band of frequencies in accordance with the frequency of a tuning signal applied thereto,
   means for applying a tuning signal to said tracking filter and varying said signal over said band of frequencies, and
   means for simultaneously playing back said one and said other signals and applying each of said signals to a respective one of said channels of said filter,
   whereby outputs representing force and velocity as a function of frequency of said band of frequencies is obtained.

References Cited

UNITED STATES PATENTS

| | | | |
|---|---|---|---|
| 3,157,045 | 11/1964 | Maki | 73—71.6 |
| 3,191,431 | 6/1965 | Schloss | 73—67.1 |
| 3,222,919 | 12/1965 | Shoor et al. | 73—71.5 XR |

JERRY W. MYRACLE, Primary Examiner

U.S. Cl. X.R.

73—7.5